US012168593B2

(12) United States Patent
Esposito et al.

(10) Patent No.: US 12,168,593 B2
(45) Date of Patent: Dec. 17, 2024

(54) LOADER FOR HOISTING SKYLIGHT ONTO ROOF

(71) Applicant: Solatube International, Inc., Vista, CA (US)

(72) Inventors: Marcelo Esposito, Vista, CA (US); Kalen Eidenschink, Vista, CA (US); John Calvanico, Vista, CA (US)

(73) Assignee: Solatube International, Inc., Vista, CA (US)

( * ) Notice: Subject to any disclaimer, the term of this patent is extended or adjusted under 35 U.S.C. 154(b) by 269 days.

(21) Appl. No.: 17/583,140

(22) Filed: Jan. 24, 2022

(65) Prior Publication Data

US 2023/0234811 A1 Jul. 27, 2023

(51) Int. Cl.

| | |
|---|---|
| ***B66F 9/02*** | (2006.01) |
| ***B66B 9/187*** | (2006.01) |
| ***B66B 9/193*** | (2006.01) |
| *E06C 7/12* | (2006.01) |

(52) U.S. Cl.

CPC .............. *B66B 9/187* (2013.01); *B66B 9/193* (2013.01); *B66F 9/02* (2013.01); *E06C 7/12* (2013.01)

(58) Field of Classification Search

CPC . B66B 9/187; B66B 9/193; B66F 9/02; E06C 7/12; E06C 1/10; E06C 1/12; E06C 1/345

USPC ...................................................... 414/10–12

See application file for complete search history.

(56) References Cited

U.S. PATENT DOCUMENTS

| | | | | |
|---|---|---|---|---|
| 3,612,219 A * | 10/1971 | Fortner | E04G 1/20 | 182/126 |
| 5,139,108 A * | 8/1992 | Pate | E06C 7/12 | 182/108 |
| 5,911,287 A * | 6/1999 | Campbell | E06C 7/12 | 182/103 |
| 8,651,259 B1 | 2/2014 | Blehm | | |
| 9,217,285 B2 * | 12/2015 | Connors | E06C 7/48 | |
| 2020/0102789 A1 * | 4/2020 | Young | E06C 1/12 | |

FOREIGN PATENT DOCUMENTS

| | | | | |
|---|---|---|---|---|
| EP | 0096953 A1 | | 12/1983 | |
| FR | 2364179 | * | 3/1969 | B66F 11/00 |
| FR | 2364179 A2 | | 4/1978 | |

OTHER PUBLICATIONS

"European Search Report", dated Jun. 12, 2023, from the counterpart European application 23152026.3.

* cited by examiner

*Primary Examiner* — Lynn E Schwenning

(74) *Attorney, Agent, or Firm* — John L. Rogitz; John M. Rogitz

(57) ABSTRACT

An L-shaped track has a vertical part configured to stand on the ground, a horizontal part configured to span over a roof, and a curved part in between. A motor-driven winch moves a carriage up and down the track. The carriage engages a skylight, which can be quickly and easily hoisted from the ground to the roof up the track to the roof to install the skylight.

9 Claims, 15 Drawing Sheets

LOADER FOR HOISTING SKYLIGHT ONTO ROOF

FIELD

The present application relates to devices for hoisting skylights onto roofs.

BACKGROUND

Skylights can be heavy yet must be hoisted onto roofs despite their weight by installers. This is particularly true as acrylic skylights are replaced with heavier glass for energy efficiency and durability. Current lift systems such as for solar panels are bulky and cumbersome, and time-consuming to erect on-site.

SUMMARY

Accordingly, an L-shaped curved loader uses a simple drill motor (such as a Mikita power drill) to actuate a winch engaged with a track. The winch moves a hoist carriage that in turn holds the skylight, which can be winched up the curved track to a horizontal part of the track that lays over the roof, affording both an easy hoist system and a means for an installer to scale the track to the roof.

In one aspect, an assembly for hoisting a skylight onto a roof includes a track with a vertical part configured to stand on the ground, a horizontal part configured to span over a roof, and a curved part in between. A motor-driven winch is coupled to a carriage to move the carriage up and down the track. The carriage is configured to engage a skylight, which can be hoisted from the ground to the roof up the track to install the skylight.

In examples, the winch can be attached to the vertical part of the track by a strap or a mount. The horizontal part of the track can be slidably engageable with the curved part of the track for modularity and breakdown for transport.

In an example, the carriage, which can be slidably engaged with the track, itself includes a separate segment of track and a tray oriented perpendicular to the track to receive a bottom edge of the skylight therein.

In another aspect, a method for lifting a skylight onto a roof includes engaging a winch with a first straight segment of a track, engaging a carriage with a second straight segment of the track, and coupling the winch to the carriage using at least one cable. The method also includes establishing a configuration of the track to have the second straight segment extend up from the ground and the first straight segment to extend over the roof, with the first and second straight segments being connected by a spanning segment. The method includes disposing the skylight onto the carriage and activating the winch to move the carriage with skylight up the track onto the roof.

In another aspect, a skylight lift system includes a lifter engaged with a track at or near a first end of the track and a carriage slidably engaged with the track at or near a second end of the track. A cable connects the lifter with the carriage. The skylight can be disposed on the carriage at or near the second end of the track and the lifter actuated to move the carriage with skylight to at or near the first end of the track.

The details of the present application, both as to its structure and operation, can best be understood in reference to the accompanying drawings, in which like reference numerals refer to like parts, and in which:

DETAILED DESCRIPTION

Figure 1:
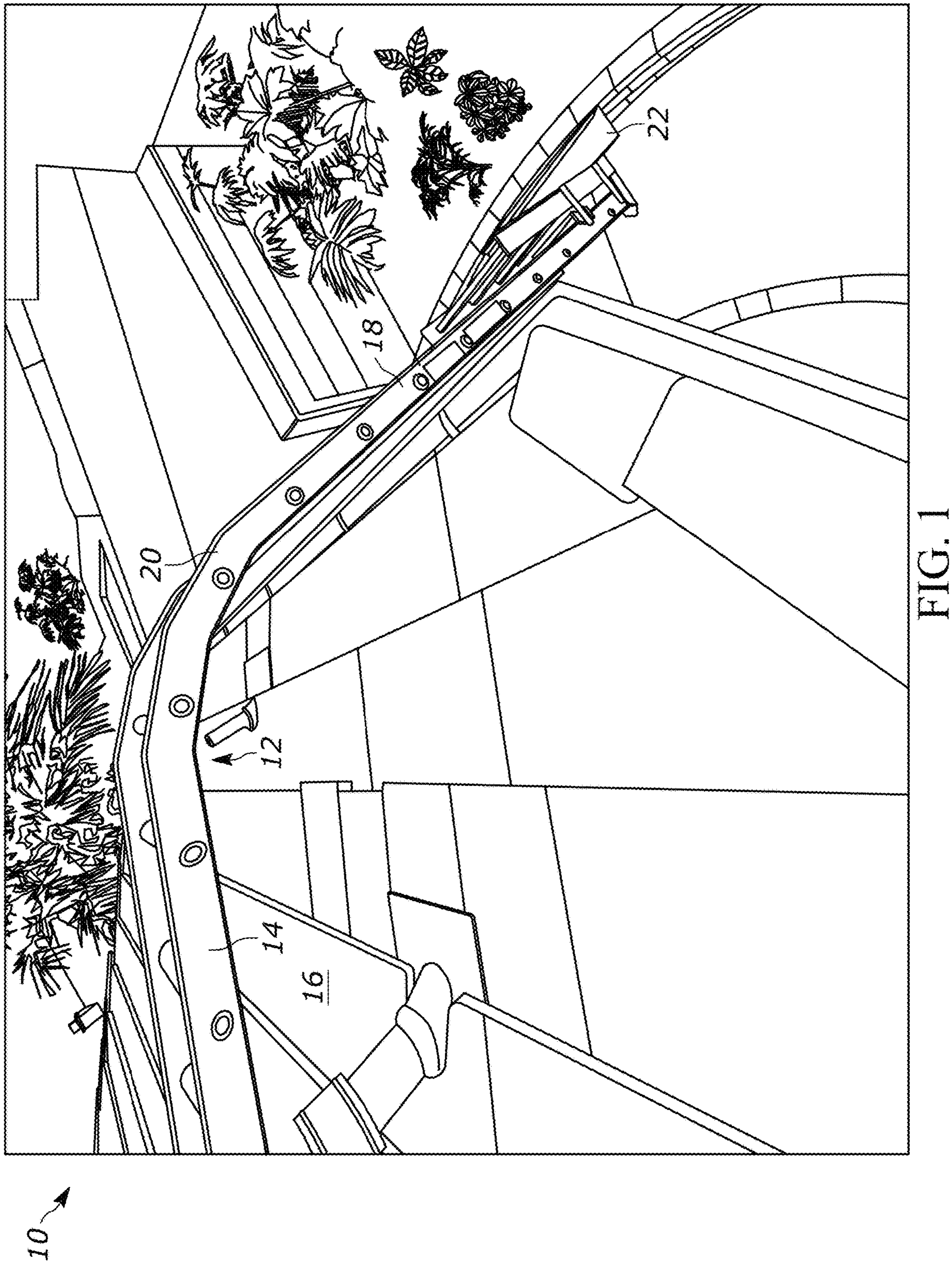
FIG. 1 illustrates an embodiment of the loader for hoisting a skylight onto a roof, with the skylight at ground level.

Referring initially to FIG. 1, a skylight lift or hoist system 10 includes a track 12 with a first straight part 14 configured to extend substantially horizontally over a roof 16 (in other words, parallel to the roof), a second straight part 18 configured to stand on the ground and rise toward the first straight part, and a transition part 20, curved in the example shown, connecting the first and second straight parts 14, 18. A carriage 22 is shown near the bottom of the track 12.

Figure 2:
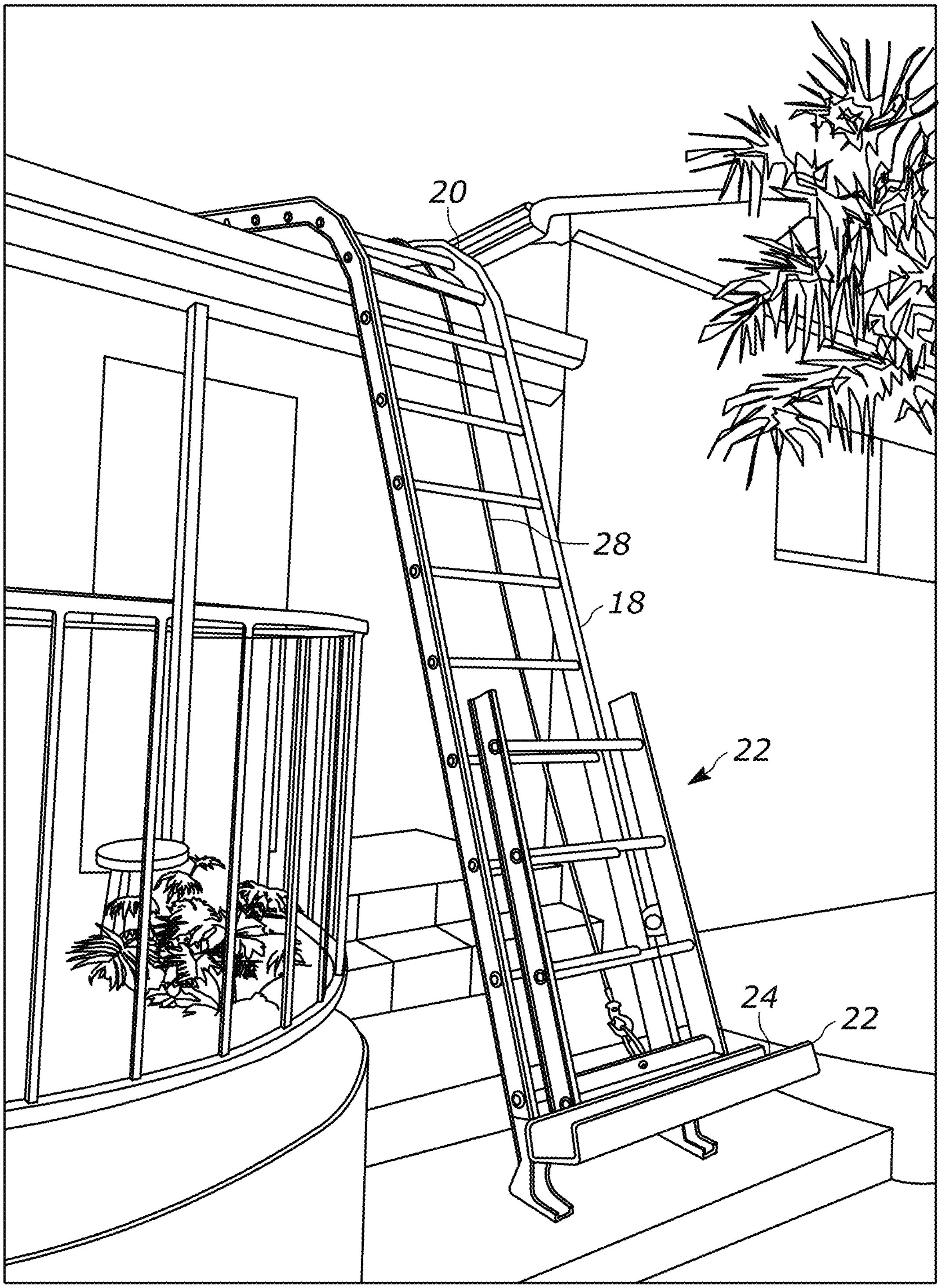
FIG. 2 illustrates the embodiment of FIG. 1 with the skylight removed from the carriage to reveal the carriage.

FIG. 2 illustrates that the carriage 22 in the non-limiting example shown can include a short track segment that is slidably engaged with the track 12 but separate therefrom. Slidable engagement may be effected by rollers on the carriage track 22 engaging slotted rails along the length of the track 12 or by other suitable means.

Figure 3:
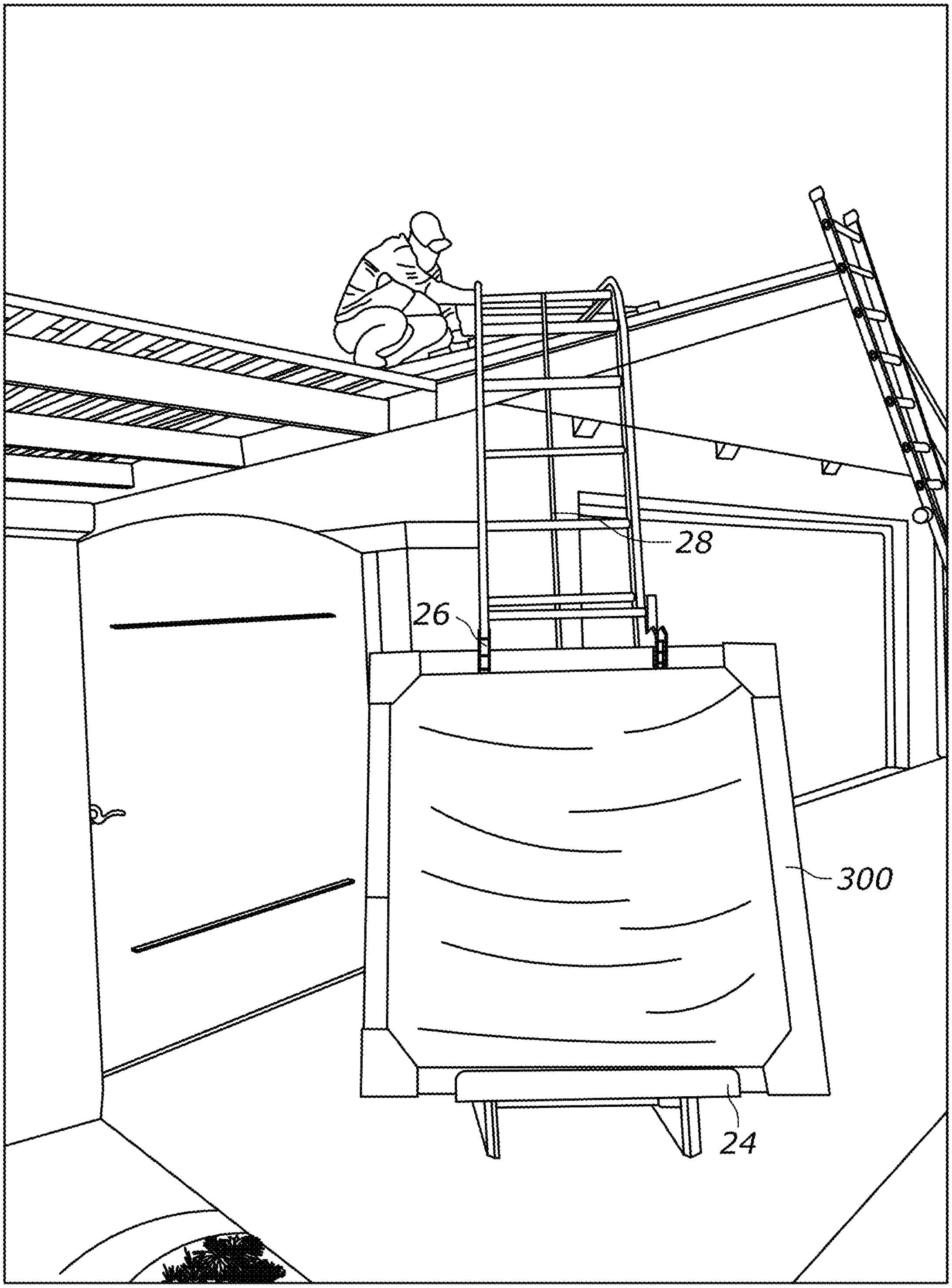
FIG. 3 illustrates the embodiment of FIG. 1 with the skylight on the carriage.
Figure 4:
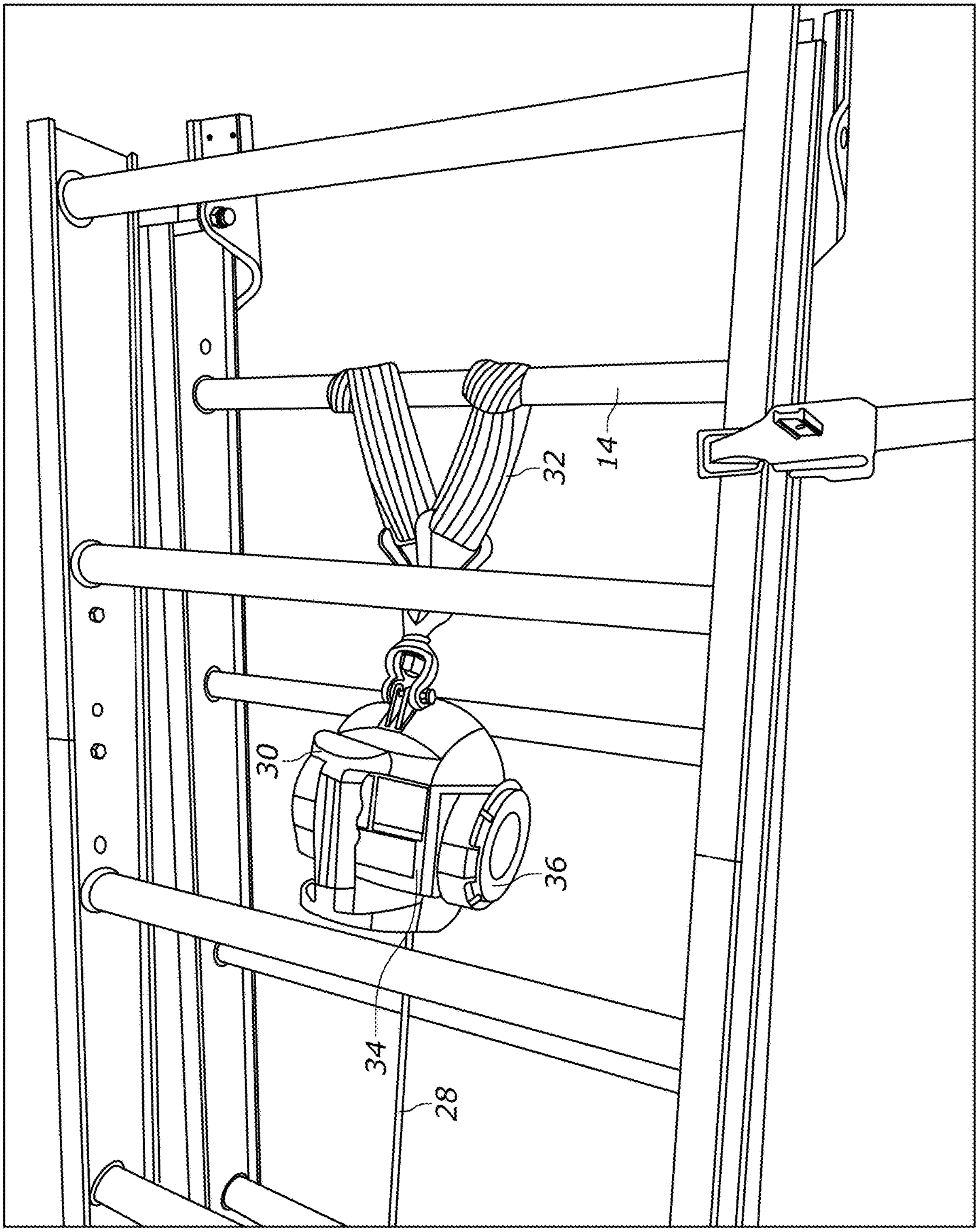
FIG. 4 illustrates the winch strapped to the top part of the track.

At the bottom of the carriage track 22, an elongated tray 24 is connected to and oriented perpendicular to the carriage track 22 to receive a bottom edge of a skylight in a slot 25 of the tray 22. FIG. 3 shows a skylight 300 in the tray 24, with upper brackets 26 on the carriage track 22 clamping the top of the skylight 300 onto a top portion of the carriage track 22. A cable 28 is shown in FIG. 3 being attached to the top of the carriage to connect the carriage to a lifter such as a motor-driven winch 30 (FIG. 4) that is coupled at or near the top of the track 12 to, e.g., the segment 14. In the example of FIG. 4, the winch 30 is connected to the segment 14 of the track 12 by straps 32.

The winch 30 may include an electric motor 34 that may be battery powered. Controls 36 may be provided to cause the winch to wind and unwind the cable 28.

Figure 5:
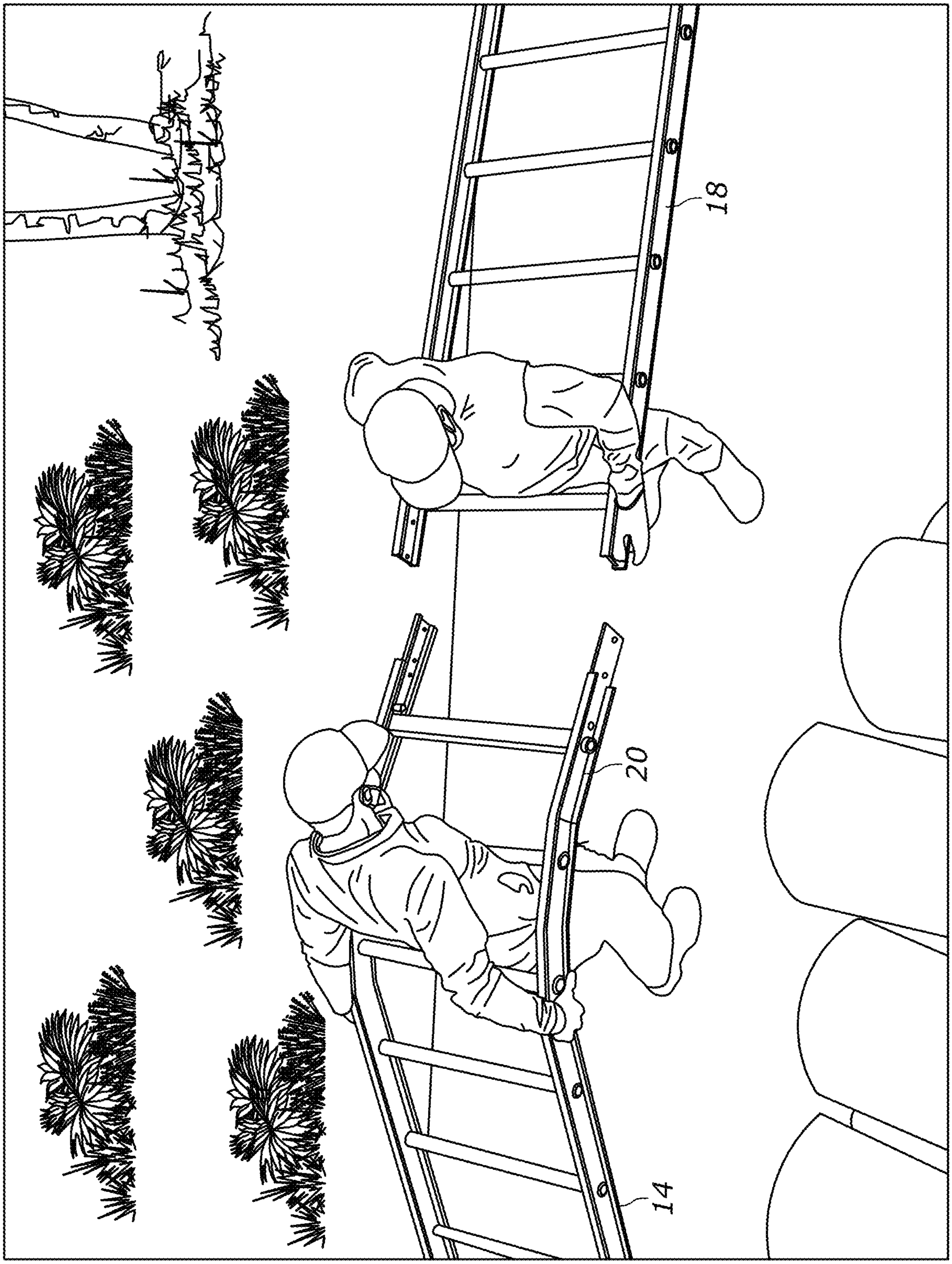
FIG. 5 illustrates a multi-part track.

FIG. 5 illustrates that for modularity and easy transport, the track 12 may be assembled in parts, with the segment 18, for example, being slidably engaged with the transition segment 20, which in turn can be slidably engaged and disengaged with the roof segment 14.

Figure 6A:
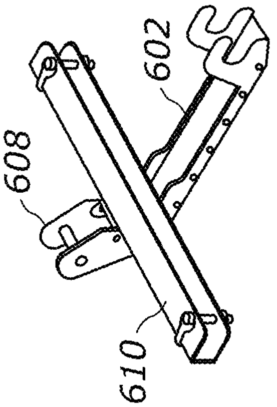
FIGS. 6 and 6A illustrate an alternate structure for engaging the winch with the track.
Figure 6:
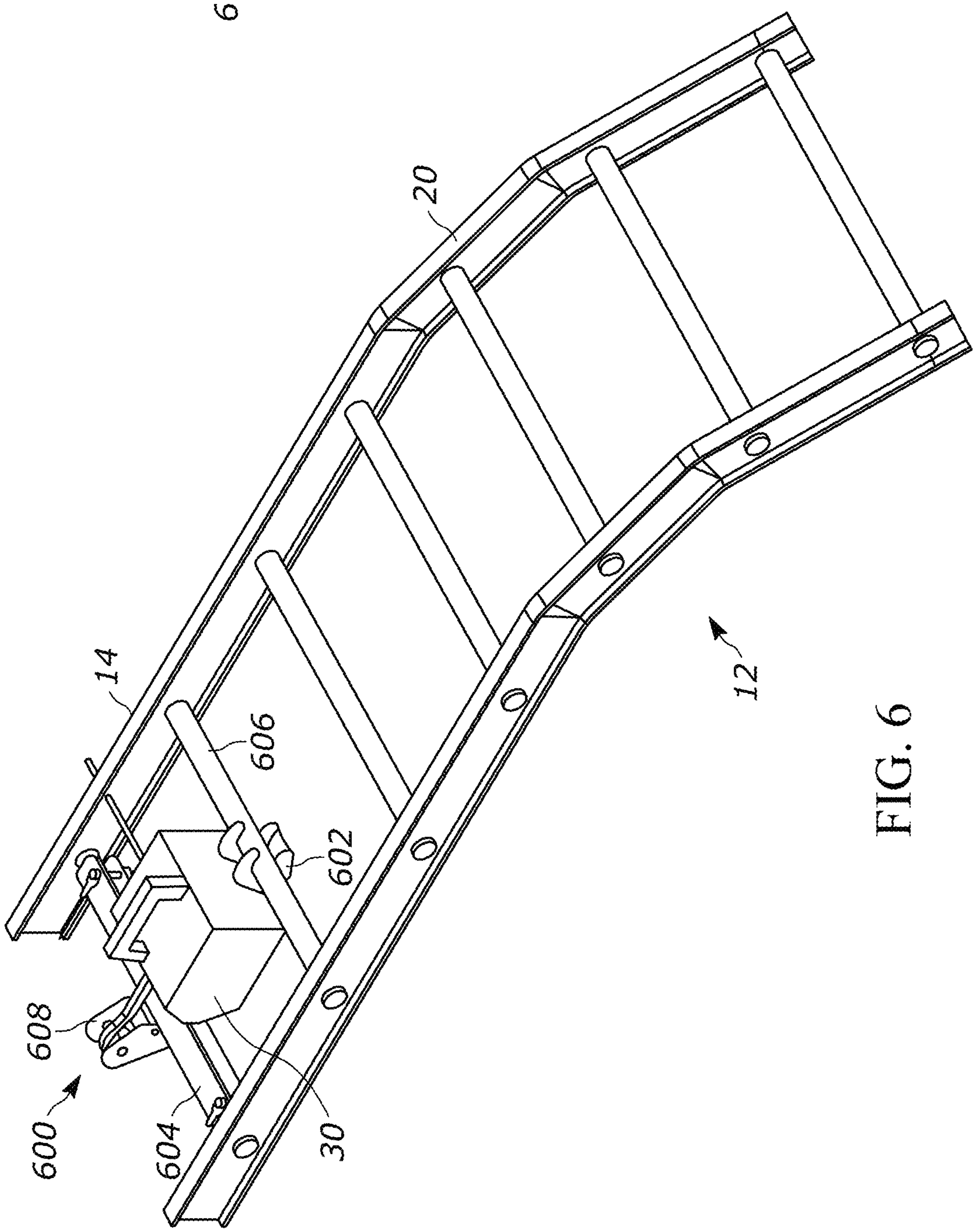

FIGS. 6 and 6A illustrate that the winch 30 can be engaged with the roof part 14 of the track 12 by a mount 600. The mount 600 can include a support bracket 602 extending under the winch 30 from a first rung 604 to a second rung 606 of the track 12. The end of the bracket 602 engaging the second rung 606 can include two U-shaped clamps as shown, while the end of the bracket 602 engaging the first rung 604 can include a cleat 608 rising up on the side of the rung opposite the winch 30 to securely hold the end of the cable 28 that extends out of the winch 30. A rail 610 may be used to receive the first rung 604 of the track to securely engage the bracket 602.

Figure 7:
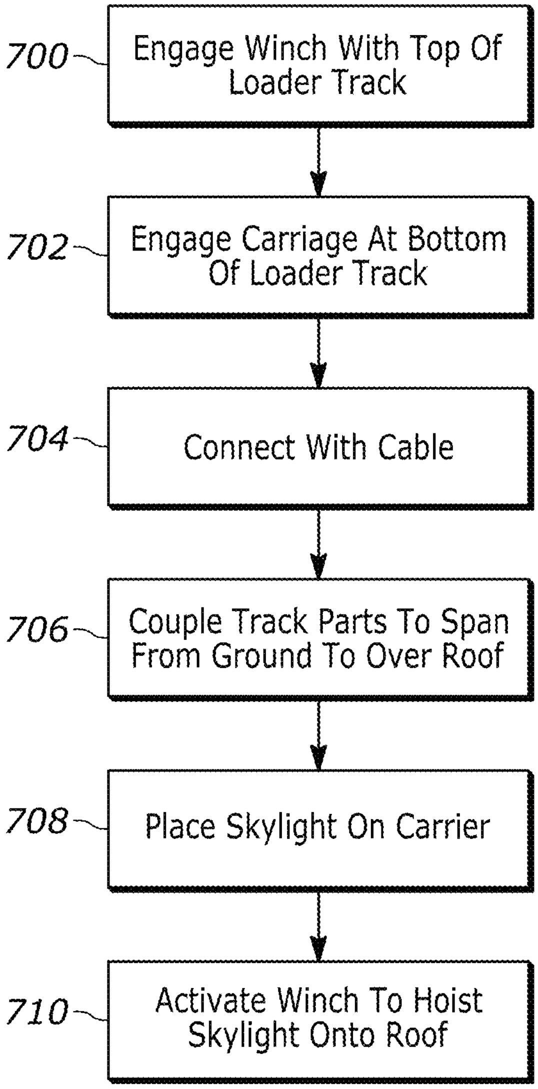
FIG. 7 illustrates a method of use in example flow chart format.

FIG. 7 illustrates a method consistent with the disclosure above for lifting the skylight 300 onto the roof 16. Commencing at block 700, the winch 30 is engaged with the first straight segment 14 of the track 12. Moving to block 702, the carriage 22 is engaged with the second straight segment 18 of the track 12.

Proceeding to block 704, the winch 30 is connected to the carriage 22 by the cable 28, which may be connected to the carriage using, e.g., a pelican hook-type connector. At block 706 the track parts, if not already assembled, are assembled into the configuration shown FIG. 1 to span from the ground where the skylight is to over and parallel to the roof.

Block 708 indicates that the skylight is disposed with its bottom edge in the tray of the carriage and then if desired its top end secured as described above. The winch is activated at block 710 to wind up the cable 28 to lift the carriage with skylight up the track onto the roof.

FIGS. 8-13 illustrate additional features that may be substantially identical to the configuration and operation of structure described in relation to FIGS. 1-7 with the exceptions noted.

Figure 8:
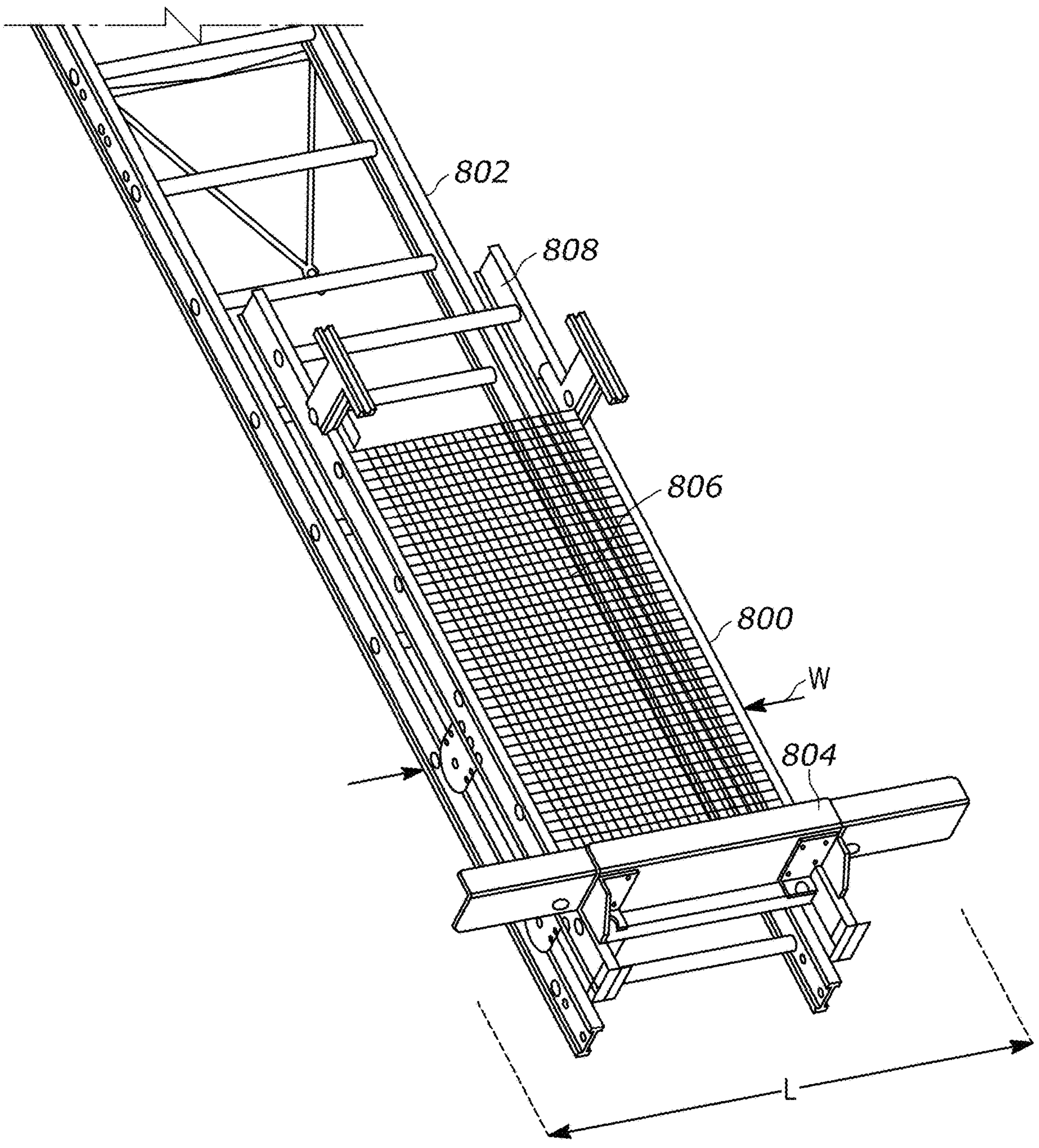
FIG. 8 illustrates an alternate example carriage.

FIG. 8 illustrates an alternate carriage 800 slidably engaged with a track 802. The carriage 800 includes a tray 804 whose length “L” is longer than the width “W” of the track 802, to form a wide base on which to support a skylight to be hoisted. As shown in FIG. 8, the carriage 800 also includes a support surface 806 that is more solid than a track segment 808 to which the support surface 806 is affixed to establish the carriage 800. The support surface 806 is formed with a grid of perforations or holes.

Figure 9:
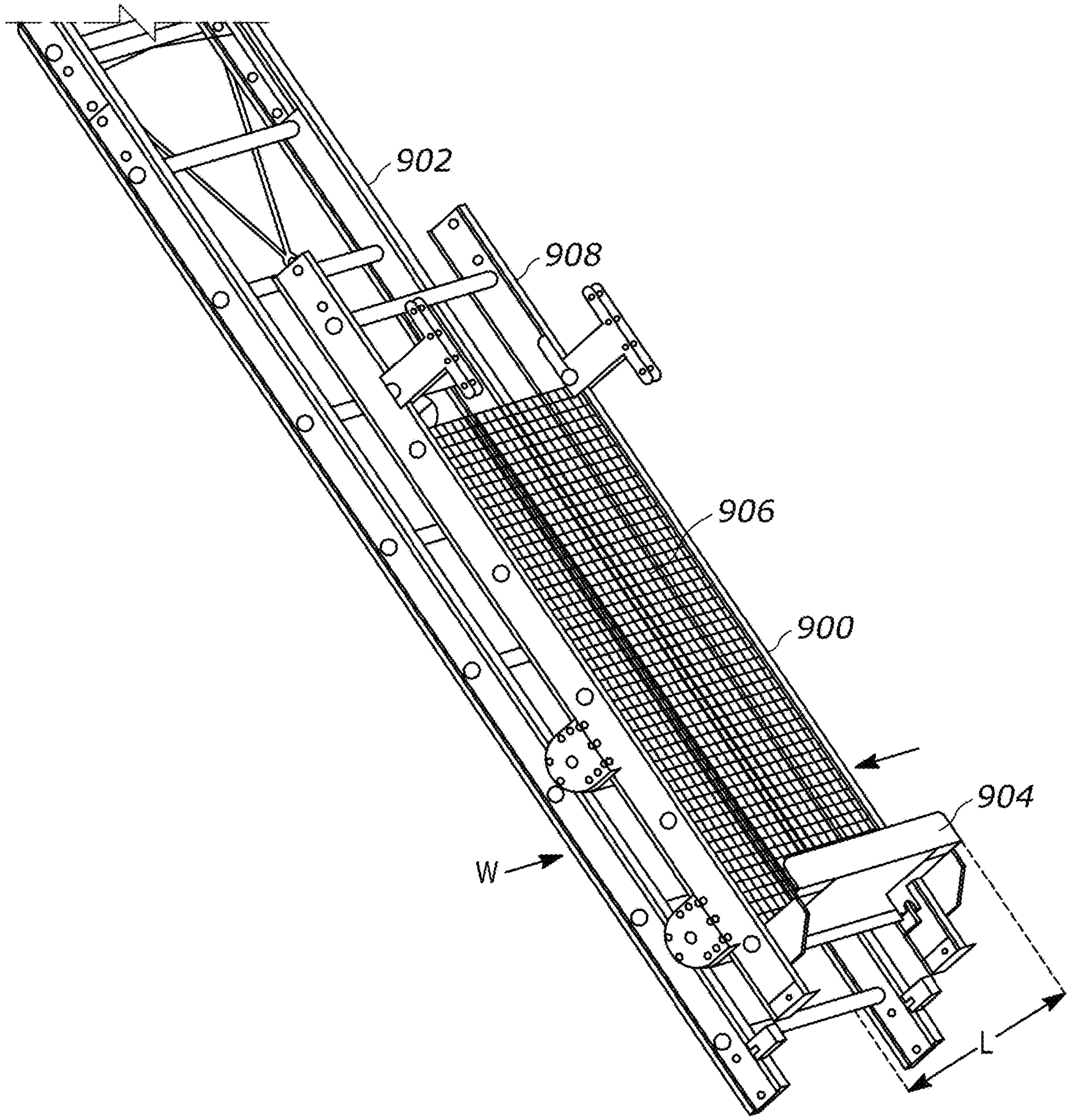
FIG. 9 illustrates an alternate example carriage.

FIG. 9 illustrates an alternate carriage 900 slidably engaged with a track 902. The carriage 900 includes a tray 904 whose length “L” is less than or equal to the width “W” of the track 902, to form a narrow base on which to support a skylight to be hoisted. As shown in FIG. 9, the carriage 900 also includes a support surface 906 that is more solid than a track segment 908 to which the support surface 906 is affixed to establish the carriage 900. The support surface 906 is formed with a grid of perforations or holes.

Figure 10:
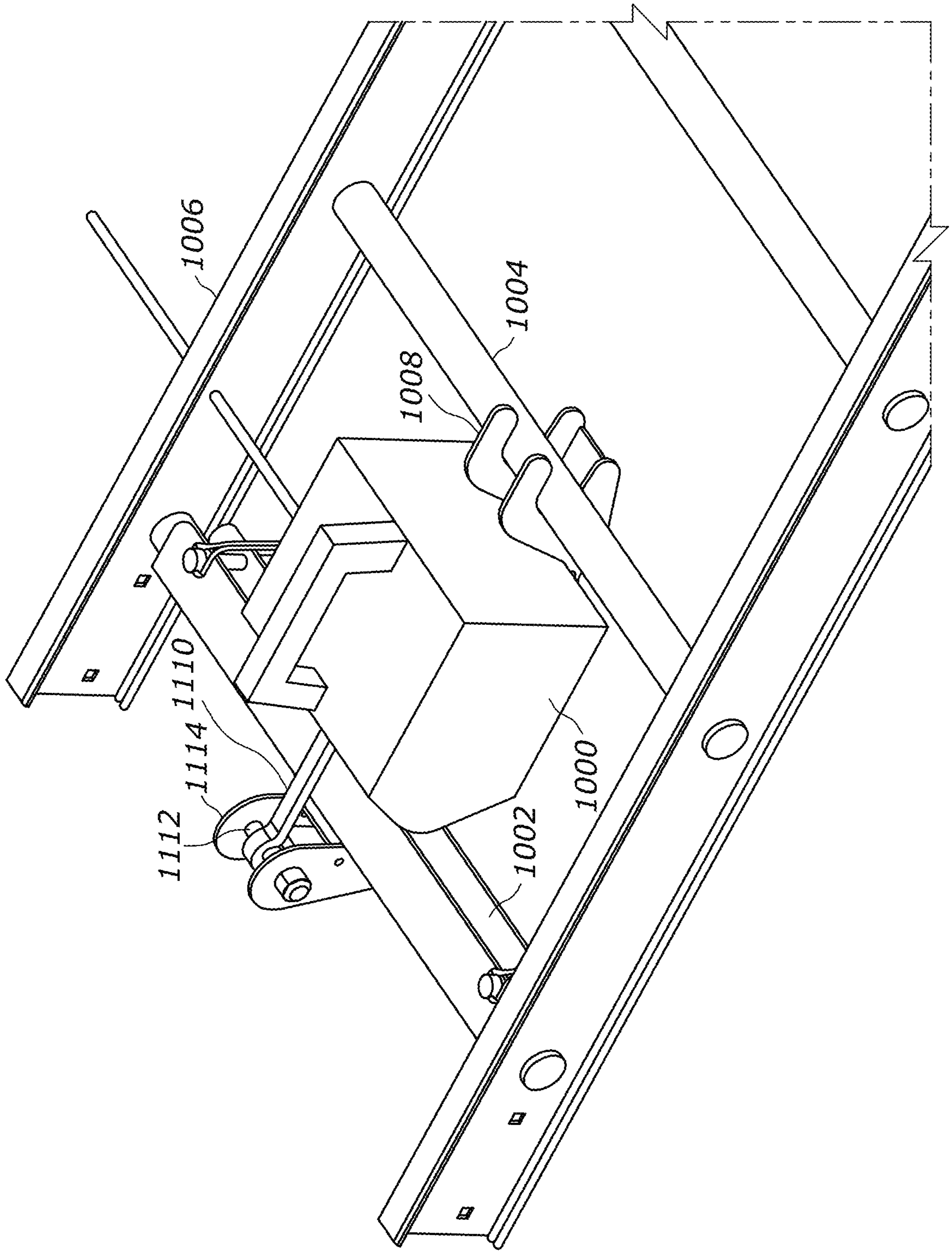
FIG. 10 illustrates an example technique for engaging the winch with the track, with portions of the track removed for clarity.

FIG. 10 illustrates a winch 1000 mounted between upper and lower rungs 1002, 1004 of a track 1006. The winch 1000 is supported on the lower rung 1004 by a dual U-shaped bracket 1008, which receives the rung 1004 in the U-shaped structure as shown.

In contrast, the winch 1000 is engaged with the upper rung 1002 by an elongated arm 1110 connected to the winch 1000 at one end of the arm 1110 and to the axle 1112 of a L-shaped bracket 1114 at its other end. The L-shaped bracket receives the upper rung 1002 in its bight to effectively suspend the winch 1000 from the upper rung 1002 when the track is oriented vertically.

Figure 11:
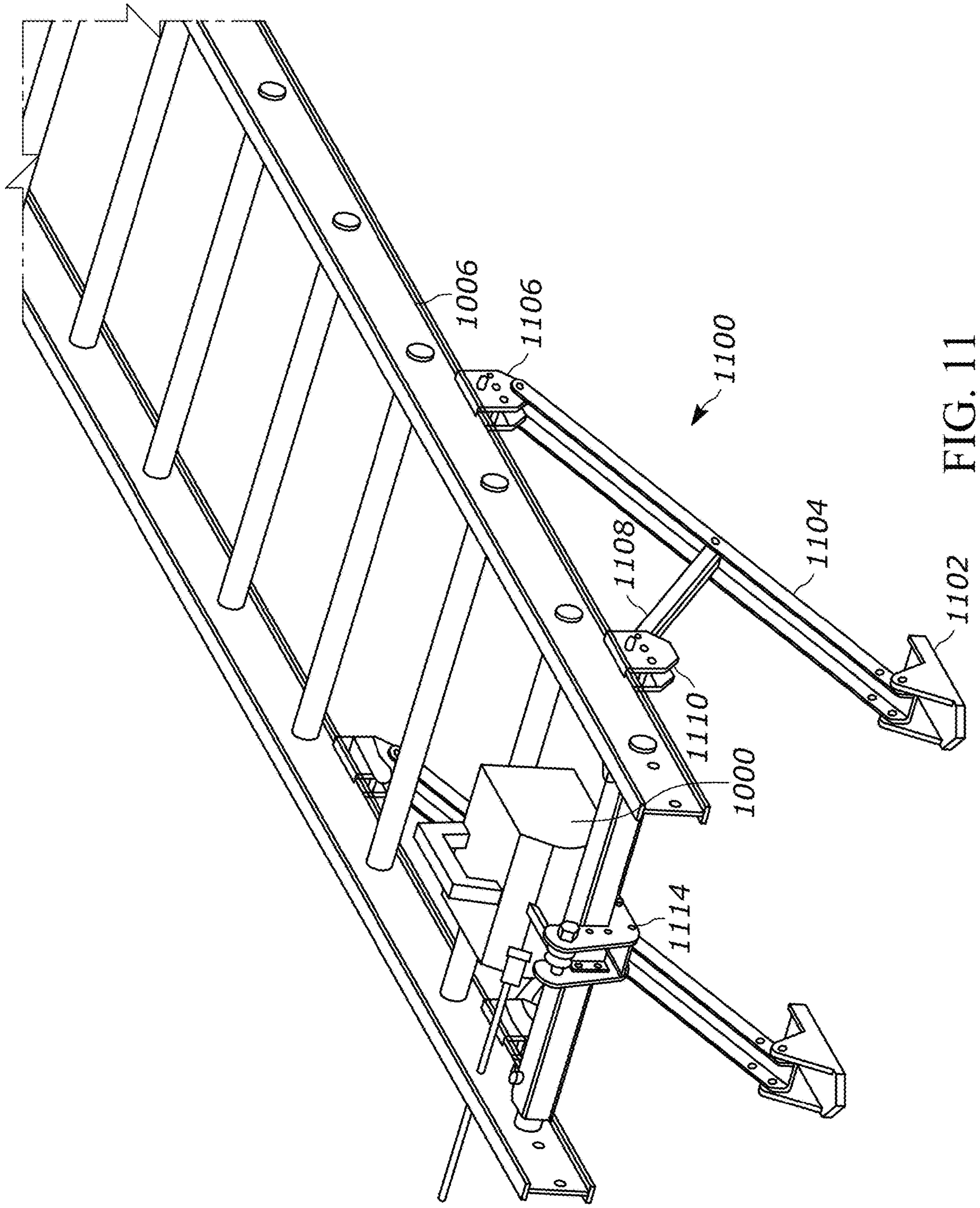
FIG. 11 illustrates collapsible legs for the track in the raised configuration, with portions of the track removed for clarity.

FIG. 11 illustrates the winch 1000 on the track 1006 and left and right collapsible legs 1100 for supporting the track 1006. Each leg 1100 includes a footing 1102 configured for resting flat on the roof and pivotably connected to one end of a main strut 1104. The other end of the main strut 1104 is pivotably connected to a bracket 1106 which in turn is coupled to the track 1006. The collapsible legs can be adjustable independently so that track support is possible not only on level or even roofs, but also on un-even or sloped roofs.

One end of a support strut 1108 is pivotably or slidably connected to the main strut 1104 near the middle of the main strut 1104 as shown, and the opposite end of the support strut 1108 is pivotably connected to a bracket 1110 which in turn is coupled to the track 1006. With this structure, the legs 1100 can be moved to the configuration shown to support the track 1006 and can be pivoted to a flat configuration in which the main struts 1104 are substantially parallel to and positioned against the track 1006.

Figure 13:
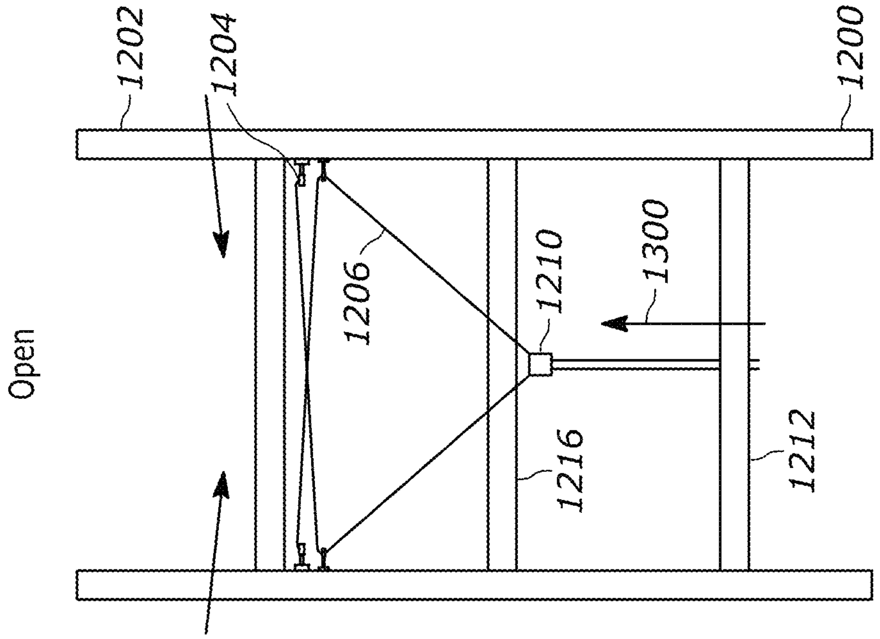
FIGS. 12 and 13 illustrate closed and open configurations, respectively, of a pin assembly for connecting two track segments, with portions of the track removed for clarity.
Figure 12:
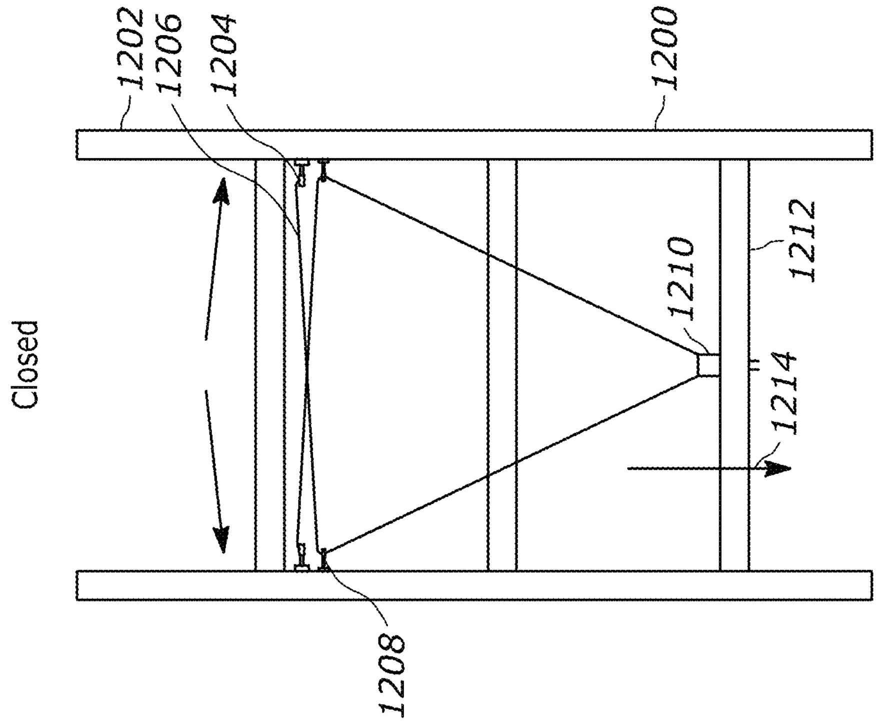

FIGS. 12 and 13 illustrate a cable-based pin assembly for locking a first track segment 1200 to a second track segment 1202 and unlocking the segments 1200, 1202 to permit slidable motion of one segment relative to the other segment.

The assembly includes left and right spring-loaded pins 1204 each of which extends through one of the segments 1200, 1202 into the other segment 1200, 1202. The pins 1204 are spring-loaded to the open configuration, shown in FIG. 13, in which the pins 1204 are disengaged with one of the segments 1200, 1202 to allow the segments 1200, 1202 to slide relative to each other. The pins 1204 may be pulled to the closed configuration shown in FIG. 12, in which the pins 1204 engage both segments 1200, 1202 to lock the segments together to prevent sliding.

Each pin 1204 is attached to a respective end of a respective cable 1206. Each cable 1206 extends from its respective pin 1204 across the track to a fitting 1208 that is opposite the respective pin 1204. The cable 1206 can slide in its fitting 1208. Each cable then extends from its respective fitting 1208 to a coupling 1210, with the coupling 1210 being affixed to both cables. The coupling 1210 can be pulled to a far rung 1212 as shown by the arrow 1214 to tension the cables 1026 and pull the pins 1204 into both segments 1200, 1202. As shown in FIG. 13, the coupling 1210 can be released from the far rung 1212 to slide toward a near rung 1216 under influence of the springs in the pins 1204 as shown by the arrow 1300, with the near rung 1216 being closer to the pins 1204 than the far rung 1212.

Figure 14:
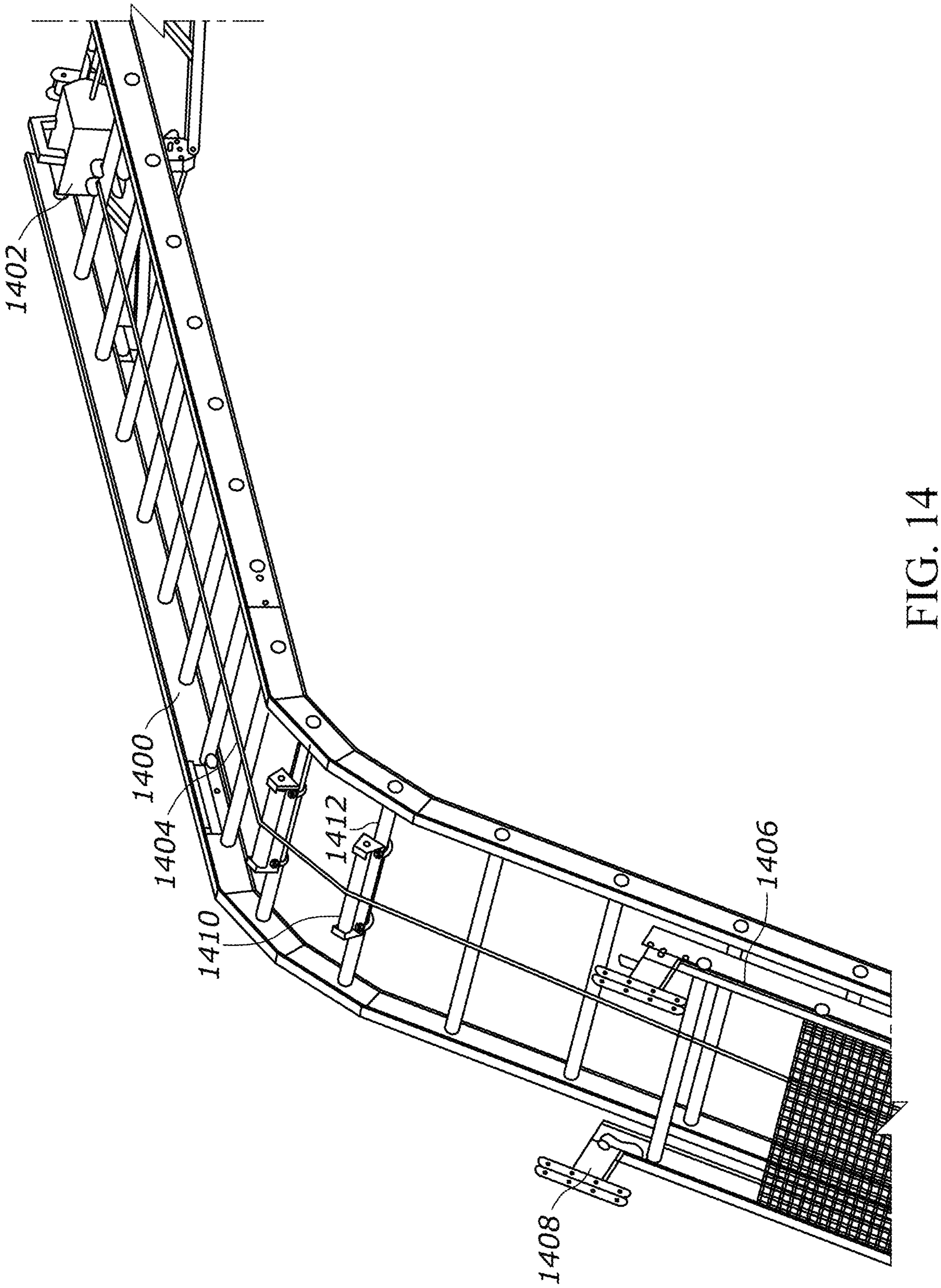
FIG. 14 illustrates sliding adjustable clamps and cable rollers on an embodiment of the track.
Figure 15:
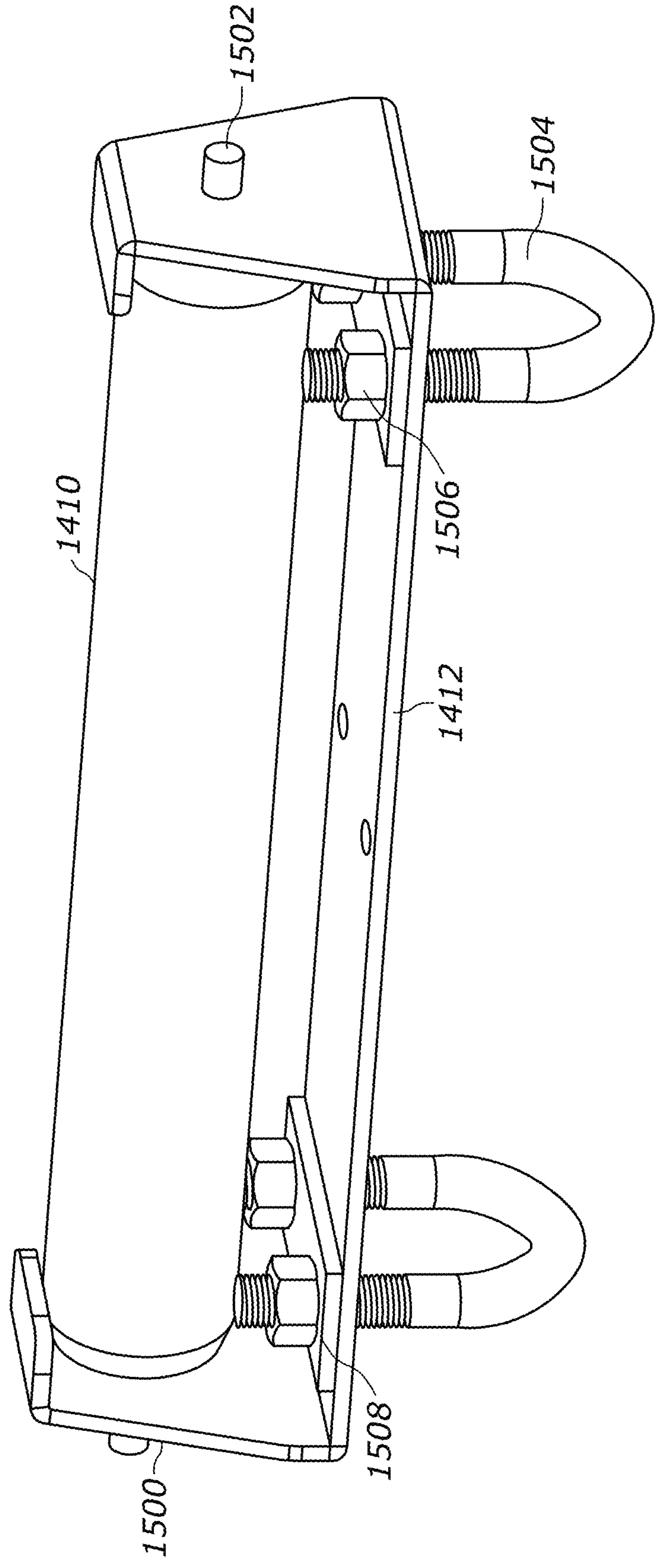
FIG. 15 illustrates details of an example cable roller.
Figure 16:
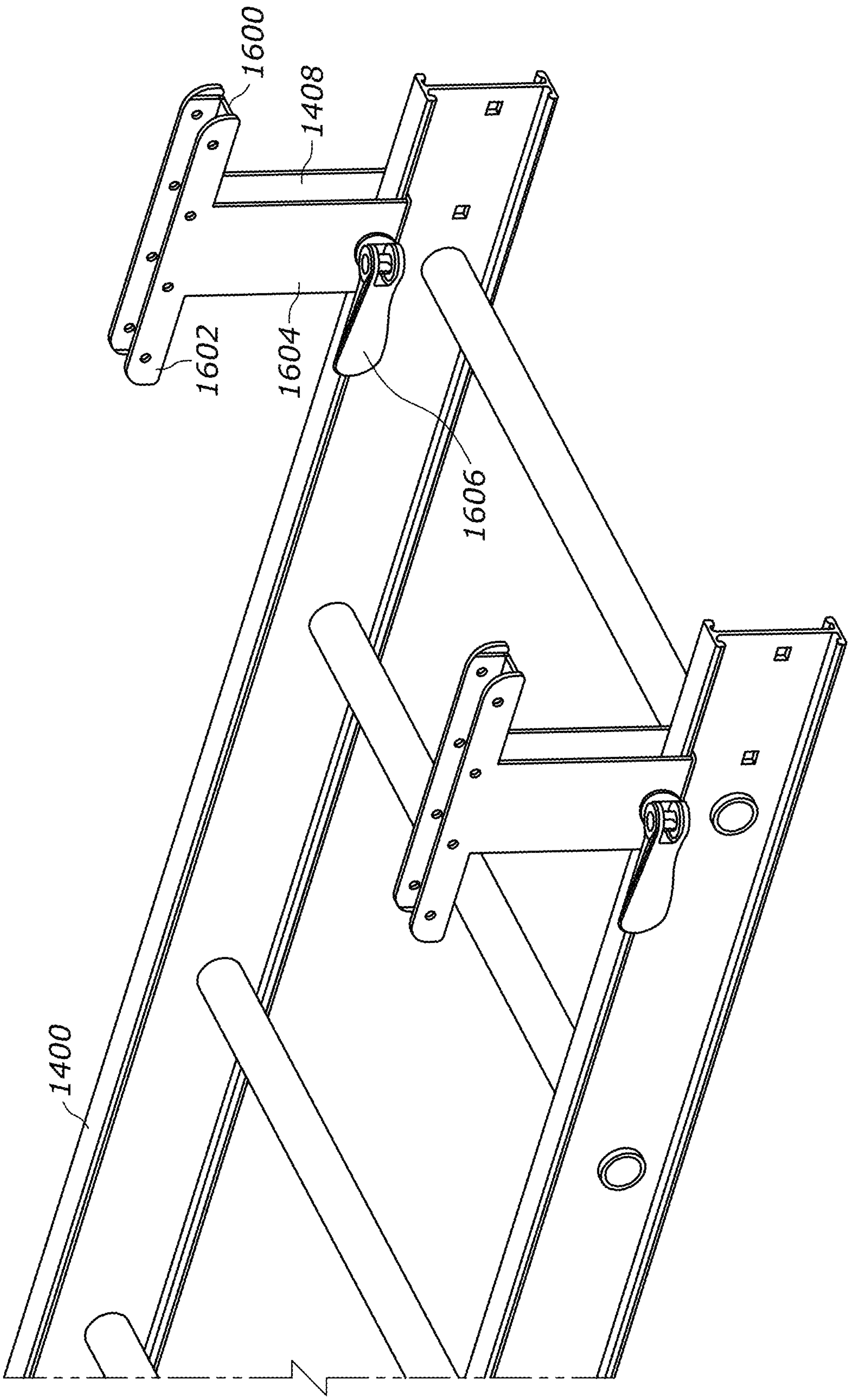
FIG. 16 illustrates details of an example sliding adjustable clamp.

FIGS. 14-16 illustrate an embodiment track 1400 that in all essential respects is identical to those disclosed above, including having a winch 1402 connected by a cable 1404 to a carriage 1406, and which further includes left and right sliding adjustable clamps 1408 on the carriage 1406 and/or track rungs and one or more cable rollers 1410 on respective rungs 1412 of the track 1400.

Turning first to the cable roller 1410, details of which appear in FIG. 15, the cable rollers 1410 are cylindrical and may be hollow if desired. Each cable roller 1410 may be fixedly or rotatably mounted to left and right rung brackets 1500 by axles 1502 to provide smooth rolling surfaces for the winch cable 1404 to ride against and at the same time protect the track rungs 1412 from wear and abrasion. In the example shown, the brackets 1500 may be connected to the track rungs by respective left and right U-shaped threaded fasteners 1504 and respective nuts 1506 to hold a lower flange 1508 of each bracket 1500 flush against the track rung 1412. Or, each bracket 1500 may be made integral to the track rung 1412 with the lower flanges 1508 being separate plates to strengthen support for the U-shaped fasteners 1504 for use of the fasteners 1504 as eyebolts from which to hang other structures.

Turn now to FIG. 16 for an explanation of the sliding adjustable clamps 1408. As shown, each clamp 1408 is T-shaped with a downward pointing leg 1600 configured to retain the top of a skylight on the carriage 1406, keeping the skylight from tipping away. An upward pointing leg 1600 of the clamp 1408 acts as a hook-like feature to hang heavy tools and/or tool bags and/or trash bags to lift or lower from the roof.

The shank 1604 of the clamp 1408 includes opposed parallel shank portions as shown that slidably straddle an edge of the track 1400. A flippable lock 1606 can be moved from a lock configuration (shown in FIG. 16), in which a plunger (not shown) of the lock is urged against the track 1400 or into one of a series of spaced holes therein to impede sliding of the clamp 1408 on the track, to an unlock configuration in which the handle of the lock 1606 is moved 90 degrees from the configuration shown in FIG. 16 to distance the plunger from the track and permit the clamp 1408 to be slid along the track as desired to an appropriately convenient location on the track.

While particular techniques are herein shown and described in detail, it is to be understood that the subject matter which is encompassed by the present invention is limited only by the claims.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

What is claimed is:

1. A skylight lift system, comprising:

a lifter engaged with a track at or near a first end of the track;

a carriage slidably engaged with the track at or near a second end of the track;

a cable connecting the lifter with the carriage, wherein a skylight can be disposed on the carriage at or near the second end of the track and the lifter actuated to move the carriage with the skylight to at or near the first end of the track; and a cable-based pin assembly for locking a first segment of the track to a second segment of the track and unlocking the segments to permit slidable motion between the segments, the cable-based pin assembly comprising:

at least one pin which extends through the first segment into the second segment, the pin being movable to an open configuration in which the pin is disengaged with one of the segments to allow the segments to slide relative to each other, the pin being movable to a closed configuration in which the pin engages both segments to lock the segments together to prevent sliding, the pin being attached to a respective portion of a respective cable extending from the pin across the track to a fitting in which the cable can move, the cable then extending from its respective fitting to a coupling pullable to tension the cable and pull the pin into both segments.

2. The system of claim 1, wherein the lifter comprises a winch.

3. The system of claim 2, wherein the winch is attached to a vertical part of the track.

4. The system of claim 1, wherein the second end of the track is slidably engaged with a connecting segment that in turn is connected to the first end.

5. The system of claim 1, wherein the carriage comprises a segment of track.

6. The system of claim 5, wherein the carriage comprises a tray oriented perpendicular to the track to receive a bottom edge of the skylight therein.

7. The system of claim 1, wherein the carriage is slidably engaged with the track.

8. The system of claim 1, wherein the carriage comprises a tray oriented perpendicular to the track to receive a bottom edge of the skylight therein.

9. The system of claim 1, wherein the track comprises first segment configured for extending inwardly over a roof, a second segment configured for extending upwardly from the ground, and a transition segment connecting the first and second segments together.

* * * * *